United States Patent [19]

Smith et al.

[11] 4,027,731

[45] June 7, 1977

[54] METHODS OF AND APPARATUS FOR HYDROCARBON RECOVERY

[75] Inventors: Clay D. Smith; D. V. Keller, Jr., both of Lafayette, N.Y.

[73] Assignee: Otisca Industries, Ltd., Lafayette, N.Y.

[22] Filed: Aug. 26, 1975

[21] Appl. No.: 607,808

Related U.S. Application Data

[62] Division of Ser. No. 460,558, April 12, 1974, Pat. No. 3,941,679.

[52] U.S. Cl. ............................. 166/267; 166/272; 166/303; 166/304; 166/305 R; 299/5; 299/17
[51] Int. Cl.² .................. E21C 41/10; E21B 43/28
[58] Field of Search .......... 166/268, 304, 305, 272, 166/267; 299/5, 2; 208/11 LE

[56] References Cited

UNITED STATES PATENTS

| | | | |
|---|---|---|---|
| 1,472,009 | 10/1923 | Knight | 166/268 UX |
| 2,587,729 | 3/1952 | Huff | 299/5 X |
| 2,859,818 | 11/1958 | Hau et al. | 166/308 UX |
| 2,885,003 | 5/1959 | Lindauer, Jr. | 166/268 |
| 3,050,289 | 8/1962 | Gener | 299/5 |
| 3,156,299 | 10/1964 | Trantham | 166/268 X |
| 3,157,231 | 11/1964 | Darley | 166/268 |

OTHER PUBLICATIONS

*Condensed Chemical Dictionary,* 8th Ed. p. 887, 1971.

*Primary Examiner*—Ernest R. Purser
*Assistant Examiner*—William F. Pate, III
*Attorney, Agent, or Firm*—Strauch, Nolan, Neale, Nies & Kurz

[57] ABSTRACT

Methods of and apparatus for recovering hydrocarbons from tar sands, oil shales, exhausted oil bearing formations and the like by solvent extraction.

9 Claims, 5 Drawing Figures

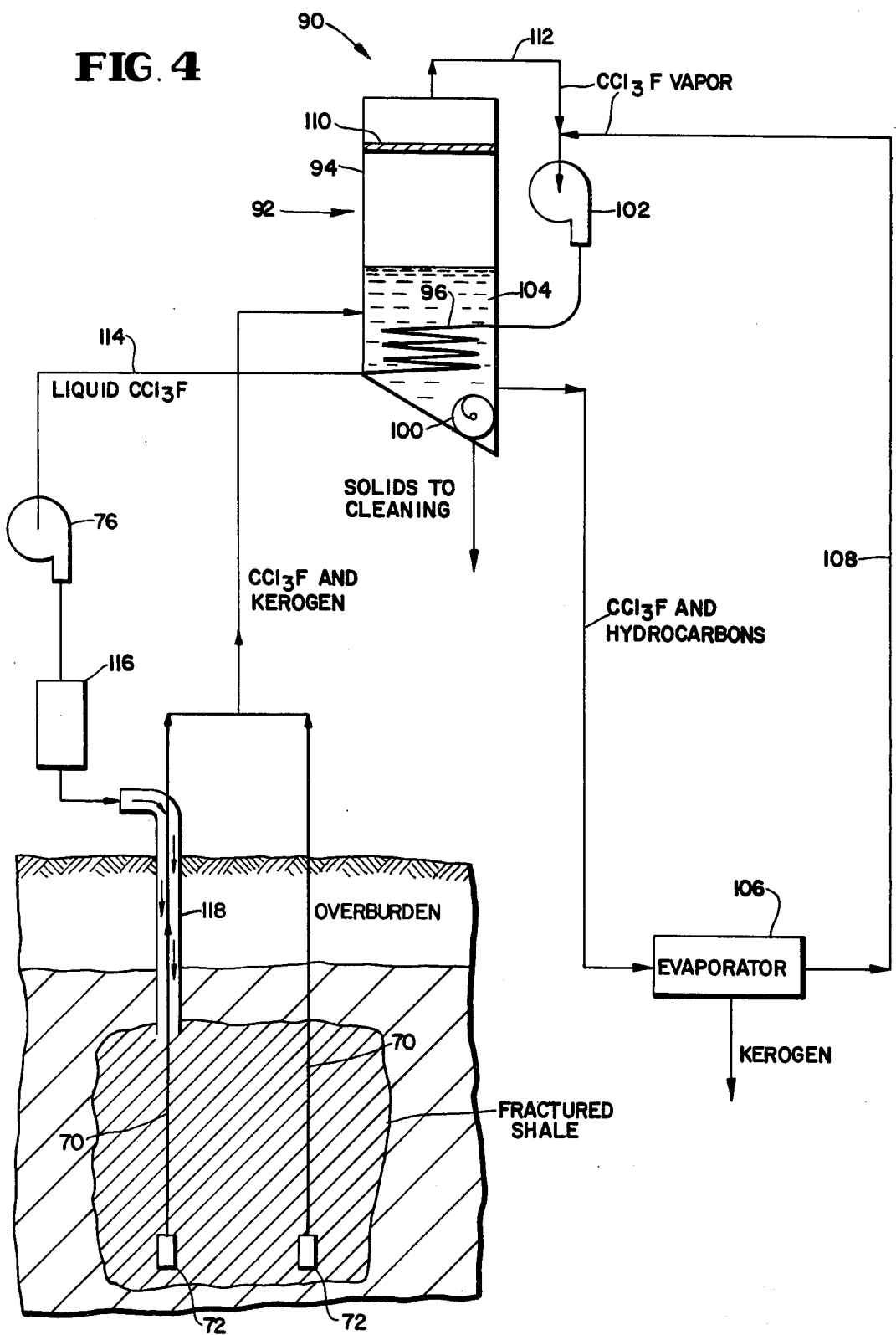

METHODS OF AND APPARATUS FOR HYDROCARBON RECOVERY

This application is a division of application Ser. No. 460,558 filed Apr. 12, 1974 (now U.S. Pat. No. 3,941,679 issued Mar. 2, 1976).

The present invention relates to the recovery of native hydrocarbons and, more particularly, to novel, improved methods of and apparatus for recovering such hydrocarbons from tar sands, oil shales, and other geological composites of hydrocarbons and mineral solids and from exhausted oil bearing formations.

Tar sands and oil shales represent the world's greatest known reserves of native hydrocarbons. The Athabaska tar sand deposits in Canada alone cover an estimated 30,000 square miles and are believed to contain some two hundred fifty to three hundred billion barrels of a bituminous material which can be converted to a synthetic crude. This is five times the proved reserves of conventional crude in all of North America and three times that produced in all of the world since 1895.

Other large deposits of oil or tar sands exist elsewhere. There are substantial deposits, for example, in Utah and California and in Iran and a number of other countries.

The reserves of petroleumlike hydrocarbons in oil shales are equally immense. Deposits occur worldwide with large deposits being found in Colorado, Utah, Wyoming, and Texas in this country. The hydrocarbon content of the oil shale deposits in the Western United States alone has been estimated to be as high as two trillion barrels.

Tar sands such as those in the Athabaska reserves are composed of sand, clay, and silt saturated with a heavy, viscous bitumen which will typically constitute 5–21 percent by weight of the composition. The formations are highly cohesive and almost impenetrable. They have a sticky, molasses-like consistency in warm weather and are rock hard in the subzero temperatures which exist in the Athabaska region in the wintertime.

Oil shales are fine-grained sedimentary rocks formed by the consolidation of beds of mud, clay, or silt. The rock contains from 20–50 gallons/ton of an organic, oil yielding material of bituminous character termed kerogen.

The separation of the hydrocarbon constituents from the mineral solids of tar sands, oil shales, and similar geological composites poses great difficulties because of the high viscosity and chemical structure of these organic constituents and because of the impermeability of the formations, especially in the case of the oil shales. However, because of the rapid depletion of proven conventional petroleum reserves and the increasing cost of conventional crudes, major efforts have been devoted to the development of processes for recovering the hydrocarbon values from such geological composites on a commercial scale and at a competitive cost.

The heretofore proposed techniques for recovering the hydrocarbon constituents from tar sands and from oil shales differ to some extent. Several approaches to the extraction problem have been promoted in both cases.

Among the techniques proposed for separating the bitumen from tar sands are the cold and hot water processes. In the former the tar sand is excavated and mixed with an organic solvent. The mixture is then introduced into a large volume of water and subjected to pressure or gravity separation.

In the hot water or flotation process the excavated sands are contacted with steam and then mixed with hot water. This produces a pulp which is introduced into a stream of hot water, creating a froth containing the bitumen. The froth is diluted with naphtha and centrifuged to remove water and mineral matter. The naphtha is then distilled off and the bitumen coked, yielding a synthetic crude which is suitable for further processing.

Another proposal for recovering hydrocarbons from tar sands, described in U.S. Pat. No. 3,157,231 issued Nov. 17, 1964, to Darley, involves the in situ extraction of the bitumen with naphtha. A variation of the Darley process, which also employs physical dislodgement of grains of sand from the formation, is disclosed in U.S. Pat. No. 3,472,553 issued Oct. 14, 1969, to Miller.

A quite different approach to the in situ recovery of native hydrocarbons from tar sands is promoted in U.S. Pat. No. 3,123,546 issued Mar. 3, 1964, to Bodine. This patentee proposes to use acoustical energy to release the hydrocarbon constituents from tar sands. The bitumen is then recovered by skimming it from the surface of a body of water employed to transmit the energy from the acoustical generator to the sands.

In a still different approach (see U.S. Pat. No. 3,050,289 issued Aug. 21, 1962, to Gerner), the tar sands are hydraulically mined with a high pressure jet of kerosene, naphtha, or gas-oil. The bitumen solution is pumped to a fractionator where the solvent is stripped off, and the sands are conveyed to a kiln where they are steam stripped of solvent and any remaining bitumen.

All of the heretofore made proposals have serious disadvantages, especially from the economic point-of-view.

One disadvantage of the prior art processes is that recovery rates are low. For example, in the flotation process as presently carried out commercially, only 60–70 percent of the bitumen present in the material removed from the formation ends up as crude.

The problem is in fact even more serious than might appear from a consideration of numerical values alone because it is the valuable, low boiling constituents which are lost to the greatest extent.

Another significant disadvantage of many heretofore proposed processes for extracting hydrocarbons from tar sands is that large quantities of water are required. This alone can disqualify a process in arid or semiarid regions and can cause considerable problems in a cold temperature locale such as the Athabaska region.

In those processes which employ a heating step or steps, the energy consumption is also an unattractive economic factor.

In the case of solvent extraction processes, another disadvantage from an economic point-of-view, discussed in U.S. Pat. No. 2,587,729 issued Mar. 4, 1952, to Huff, is that the solvents heretofore employed in recovering hydrocarbons from tar sands have such an affinity for the sand that a significant percentage of the solvent is lost in the extraction process. This adds appreciably to the cost of the process.

Yet another disadvantage of many heretofore proposed processes is that they generate large quantities of environmentally undesirable waste products. Disposal of these materials creates significant problems, both technically and economically.

In addition, many of the proposed processes involve ancillary or preliminary steps which make them undesirable. The Darley process, for example, involves the sinking of piling to form a divided, enclosed area and the excavation of the tar sands from one of the enclosed areas. This is unattractive from an economic point-of-view.

The heretofore proposed processes for recovering hydrocarbons from oil shales and substances of a similar nature have, if anything, more disadvantages than those available for processing tar sands.

Probably the most widely investigated technique for processing oil shale involves mining and crushing the shale and loading it into a closed retort where it is destructively distilled in a non-oxidizing atmosphere.

Another proposal which has received wide publicity involves the detonation of nuclear explosives in oil shale strata to fracture the shale. The shale is then heated to release the hydrocarbons, typically by burning a combustible gas underground. U.S. Pat. No. 3,342,257 issued Sept. 19, 1967, to Jacobs describes a process of this character.

More conventional techniques for the in situ recovery of the kerogen from oil shales are described in U.S. Pat. Nos. 3,501,201 issued Mar. 17, 1970, to Closmann and U.S. Pat. No. 3,695,354 issued Oct. 3, 1972, to Dilgren. Both processes involve the circulation of a hot fluid through fractured oil shale to dissolve out the hydrocarbon constituents of the shale or to thermally convert them to fluids which can be entrained in the circulating medium. The hydrocarbons are then recovered from the circulating medium for further processing.

A related process is described in U.S. Pat. No. 3,661,423 issued May 9, 1972, to Garret. This patentee's process differs from that just described in that hot gases are employed to release the hydrocarbons from the fractured shale.

Yet another type of process for recovering hydrocarbons from oil shale involves the steps of mining and crushing the shale and then contacting the crushed shale with a solvent to extract the hydrocarbons. This process is disclosed in U.S. Pat. No. 2,596,793 issued May 13, 1962, to Schabelitz and U.S. Pat. No. 3,503,868 issued Mar. 31, 1970, to Shields.

As in the case of tar sands, a major disadvantage of at least the majority of the heretofore proposed techniques for recovering hydrocarbons from oil shales is that only a fraction of the hydrocarbon is recovered in the form of crude.

Also, the hydrocarbons present in oil shales have a high sulfur content. This creates a pollution control problem in processes involving high temperatures and vapor generation such as retorting.

And, in the processes employing high temperatures, energy consumption becomes a limiting factor as it does in the recovery of hydrocarbons from tar sands.

The solvent extraction processes heretofore proposed for recovering hydrocarbons from oil shale employ high pressures as well as elevated temperatures. For example, the process described in the Shields patent identified above involves pressures as high as 1000 psi and the process disclosed in the Schabelitz patent may employ even higher pressures.

High pressures are undesirable because of the safety factor. Also, reactors and ancillary components capable of withstanding high pressures are costly.

Another disadvantage of heretofore proposed oil shale solvent extraction processes is that the solvents employed in them have undesirable properties. The Schabelitz process, for example, utilizes methylene chloride as the solvent. Inhalation of this compound can cause physiological damage as can prolonged or repeated contact of the compound with the skin.

We have now invented novel processes for recovering hydrocarbons from tar sands, oil shales, and other hydrocarbon bearing geological composites which are free of the abovediscussed disadvantages of the prior art processes.

Our hydrocarbon recovery processes are of the solvent extraction type. They are, in one respect, novel in that liquid trichlorofluoromethane is utilized as the extraction solvent. We have unexpectedly discovered that the bitumen found in tar sands and the kerogen in oil shales dissolve readily in this medium, permitting the hydrocarbon values to be easily separated from the mineral solids of the geological composite. The solvent can be removed by a simple and conventional distillation step, by stripping, etc. to isolate the hydrocarbons.

The extraction of the hydrocarbons from the mineral solids can be accomplished in situ in the formation or in an appropriate reactor.

This extraction step can be carried out at atmospheric pressure and at ambient temperatures as low as $-50°$ to $60°$ F. This, coupled with the unique capability of trichlorofluoromethane for dissolving the hydrocarbon constituents of tar sands, oil shales and other hydrocarbon bearing geological composites and additional desirable characteristics of the trichlorofluoromethane solvent a gives our novel process a number of important advantages.

Essentially all of the hydrocarbons can be extracted from the mineral solids. And, because the process can operate at ambient temperatures, low boiling point compounds are not lost in the extraction process.

A further advantage flowing from the ambient character of the process is that fuel requirements are reduced to a fraction of what they are in typical prior art processes.

Only a miniscule amount of water is employed in our extraction process. Thus, the difficulties and expense of furnishing the large volumes of water required for the flotation process discussed above are eliminated as well as the problem of disposing of or reclaiming the water after it has become contaminated in the extraction process.

Also, the mineral residue can be economically cleaned to the point where it is essentially free of contaminants capable of posing an ecological hazard.

Because extraction of the hydrocarbons proceeds rapidly at atmospheric pressure, the need for carrying out the process at elevated pressures is eliminated. This is important from the viewpoints of safety and equipment costs.

Trichlorofluoromethane is not flammable. It has low boiling and freezing points (ca. $75°$ and $-168°$ F., respectively), a low heat of vaporization and low viscosity and surface tension, all of which are desirable. The compound does not react with hydrocarbons; and it is non-toxic and non-corrosive, available in large quantities at reasonable cost, and almost completely recoverable in the course of the extraction process. Again, these are important factors from the economic and safety viewpoints.

It is surprising not only that the extraction of hydrocarbons from geological composites with trichlorofluoromethane has the many advantages discussed above but that it can be used at all for this purpose. This is particularly true in the case of oil shales and the like because kerogens are noted for their poor solubility in organic solvents (see the Shields patent identified above; The Condensed Chemical Dictionary, 6th Ed., Reinhold Publishing Co., New York, N.Y., 1961, p. 642; and A Dictionary of Mining, Mineral, and Related Terms, U.S. Government Printing Office, 1968, p. 764).

In another aspect we have also invented novel apparatus for extracting hydrocarbon values from hydrocarbon bearing geological composites. If the composite is mined and then produced, the apparatus will typically include components for excavating the composite and, in the case of shales and the like, crushing the excavated material. In line therewith are reactors in which the hydrocarbons are stripped from the mineral solids and the latter then cleaned.

Provision is also made for recovering the diluted hydrocarbon bearing liquor after it has circulated through the reactors and separating any solids. The solvent is then removed and recovered, isolating the hydrocarbons for further processing.

There is also provision in the apparatus for separating liquid solvent from the cleaned mineral solids and then drying the solids to recover the remaining solvent associated with the solids. The vapor evolved in the dryer is combined with vapor recovered from the reactors, condensed, and returned to solvent storage.

In our novel apparatus the extraction solvent is preferably circulated in counterflow relationship to the composite being extracted both within each reactor and in the system as a whole, the latter goal being accomplished by employing the liquid effluent from each extraction stage as the solvent for the preceding stage. This makes the most efficient use of the solvent, which is important from an economic viewpoint and, also, maximizes the concentration of the hydrocarbons in the liquid delivered to the system component where the solvent is separated from the hydrocarbons. This latter factor is important in that it minimizes the amount of solvent which must be separated and, therefore, the energy required to recover and cost of recovering the solvent.

The apparatus for in situ recovery of hydrocarbons will, in a typical embodiment, include submersible pumps in the formation being produced and equipment for pumping extraction solvent into the formation. The solvent percolates downwardly through the formation, separating the hydrocarbons from the mineral solids to produce a liquor which is lifted to the surface by the submersible pumps.

Above ground is a concentrator where fines unavoidably pumped to the surface with the liquor are removed and the concentration of the hydrocarbons in the liquor increased. Also located above ground is equipment for cleaning the solids, for separating the extraction solvent from the hydrocarbons, and for recovering this solvent and any solvent which vaporizes in the various system components.

In addition to those discussed above, our invention has the advantage that apparatuses in accord with its principles have extremely high throughput rates. In tests involving several different samples, throughput rates of less than two minutes have been readily obtained.

Another advantage of our novel apparatus is that in applications involving mining or excavating of the composite to be produced, the entire system can be made mobile as by mounting the system components on tracked or other chassis. This allows the entire system to move through the area in which the deposit of geological composite is located, continuously excavating the composite and discharging hydrocarbons and cleaned mineral solids.

In addition to the obvious advantages this results in a system which can be employed to recover hydrocarbons from composites such as tar sands in both warm weather and in the sub-zero temperatures which reign in areas such as the Athabaska region in the wintertime. This capability is unique.

In another aspect we have also invented techniques for the in situ solvent extraction of hydrocarbon values from geological composites which are unique aside from the solvent used in the process.

As suggested above in the description of the equipment we employ for the in situ recovery of hydrocarbon values, our novel approach involves locating submersible pumps in the formation of the composite to be produced or in a sump in the formation and fracturing or otherwise making the formation permeable, if necessary. The extraction solvent is then injected into the formation at one or more levels above the pumps and allowed to percolate down through the formation.

As it migrates downwardly, the solvent extracts the hydrocarbon values from the mineral solids of the composite. The hydrocarbon, solvent liquor is recovered by the submersed pumps and lifted to the surface where fines entrained in the liquor are separated and the solvent stripped from the hydrocarbons, isolating the latter and recovering the solvent.

The extraction phase is followed by one in which solvent vaporized in the formation during the extraction phase is vacuum pumped to the surface and condensed. Finally, air or nitrogen may be pumped though the formation to recover any remaining vaporized solvent. This results in a virtually complete recovery of the extraction solvent.

This novel technique of producing geological composites in situ contributes to a number of the important advantages discussed above — high recovery rates and reduced production costs are included among these.

Another important advantage of the novel in situ hydrocarbon recovery technique just described is that it can be employed to recover oil from wells which have been exhausted by conventional production techniques at an attractive cost.

From the foregoing it will be apparent to the reader that one primary object of the invention resides in the provision of novel, improved processes and apparatus for extracting hydrocarbons from tar sands, oil shales, and other hydrocarbon bearing geological composites and from exhausted oil bearing formations.

Other important but more specific objects of the invention reside in the provision of processes in accord with the preceding object:

1. which permit the separation of hydrocarbons from mineral solids to be accomplished at an economically attractive cost.

2. which permit hydrocarbons to be recovered from tar sands, oil shales, and other composites with a minimum of ecological disruption.

3. which, in conjunction with the preceding object, produce less residue than prior art processes such as the flotation type.

4. which, in conjunction with objects 2 and 3, produce residues essentially free of hydrocarbons and harmful chemicals.

5. which are readily adaptable for use in arid regions and in regions of low and widely different ambient temperatures.

6. which provide a high rate of recovery of hydrocarbon constituents.

7. which, in conjunction with the preceding object, minimize the loss of the lower boiling point, more volatile hydrocarbons.

8. which can be carried out in situ or by first mining and then processing the composite.

9. which eliminate safety hazards and economic disadvantages appurtenant to those prior art processes employing high pressures and toxic chemicals.

10. which have a reduced energy requirement in comparison to heretofore proposed extraction processes, especially those employing retorting and acoustical energy, for example.

11. which can be carried out at atmospheric pressure.

12. which employ solvent extraction and in which the solvent is essentially completely recoverable in the course of the extraction process.

13. in which, in conjunction with the preceding object, the effectiveness of the extraction solvent is maximized.

14. which, in conjunction with the preceding object, employ an extraction solvent which is not flammable, has low boiling and freezing points, viscosity, and surface tension, is non-toxic, non-corrosive, and available at reasonable cost and in which the types of hydrocarbons found in tar sands, oil shales, and other hydrocarbon bearing formations are readily and highly soluble.

15. which have various combinations of the foregoing attributes.

Another important and primary object of the invention resides in the provision of novel, improved apparatus for so extracting hydrocarbons from hydrocarbon bearing geological composites and from oil bearing formations as to contribute to realization of the benefits discussed above.

Related and also important objects of our invention reside in the provision of apparatus in accord with the preceding object:

16. which can be made mobile and can therefore move along the deposit being produced, eliminating the necessity of transporting the material to be produced to an extraction plant and of transporting the tailings from the extraction process away from the plant.

17. which can be operated at temperatures ranging from those found in the warmer climates in the summertime to as low as −50° to 60° Fahrenheit.

Other important objects and features and additional advantages of the invention will become apparent from the appended claims and as the ensuing detailed description and discussion proceeds in conjunction with the accompanying drawing, in which:

FIG. 2 shows, diagrammatically, modifications which can be made to adapt the apparatus of FIG. 1 to the recovery of hydrocarbon values from oil shales and the like.

Figure 3A:
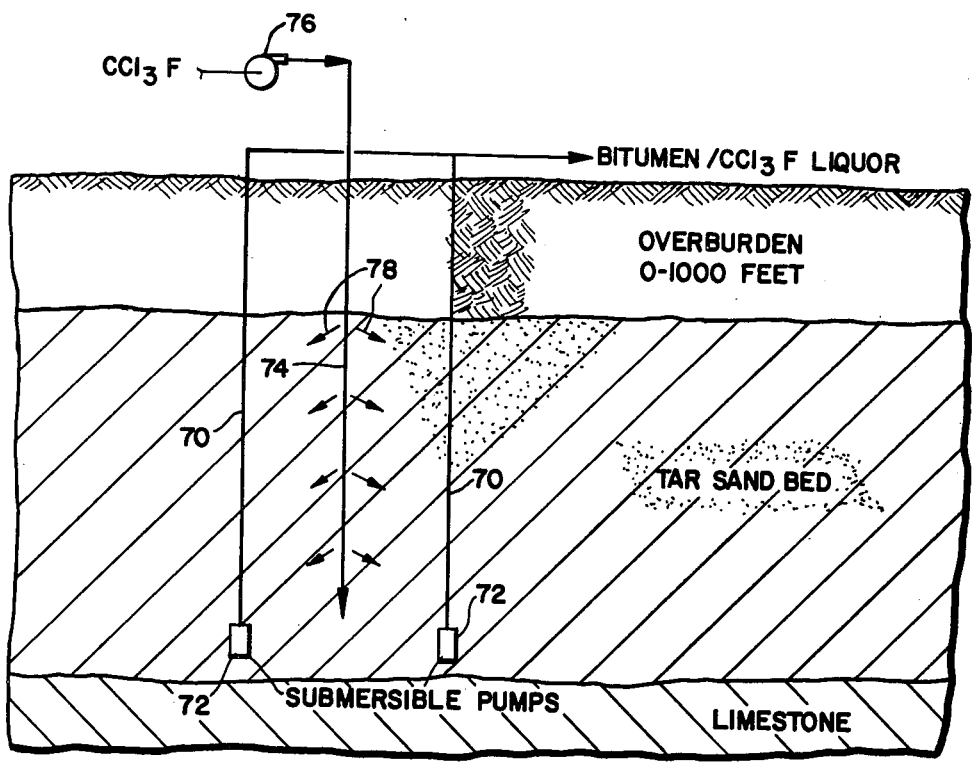
Figure 3B:
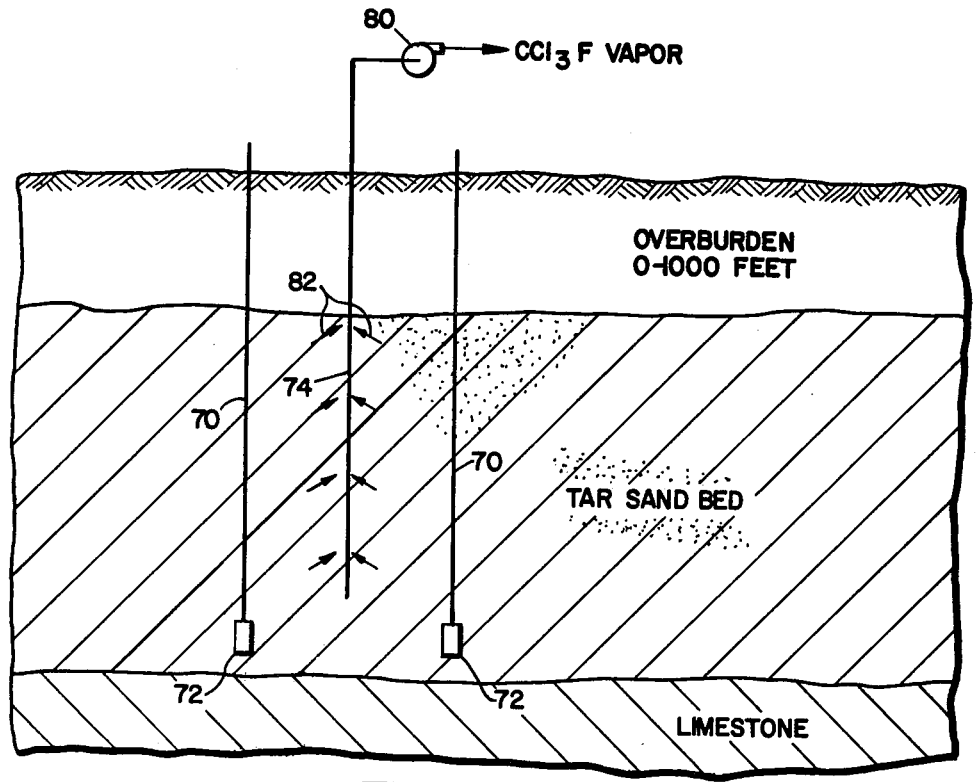

FIGS. 3A and 3B show, diagrammatrically, certain of the equipment employed and the steps involved in one process for recovering hydrocarbon values in situ in accord with the principles of the present invention from tar sands and other formations which are or can be made permeable and from exhausted oil bearing formations; and FIG. 4 illustrates, diagrammatically, a complete system for the in situ recovery of hydrocarbon values from a hydrocarbon bearing geological composite or from an exhausted oil bearing formation.

Figure 1:
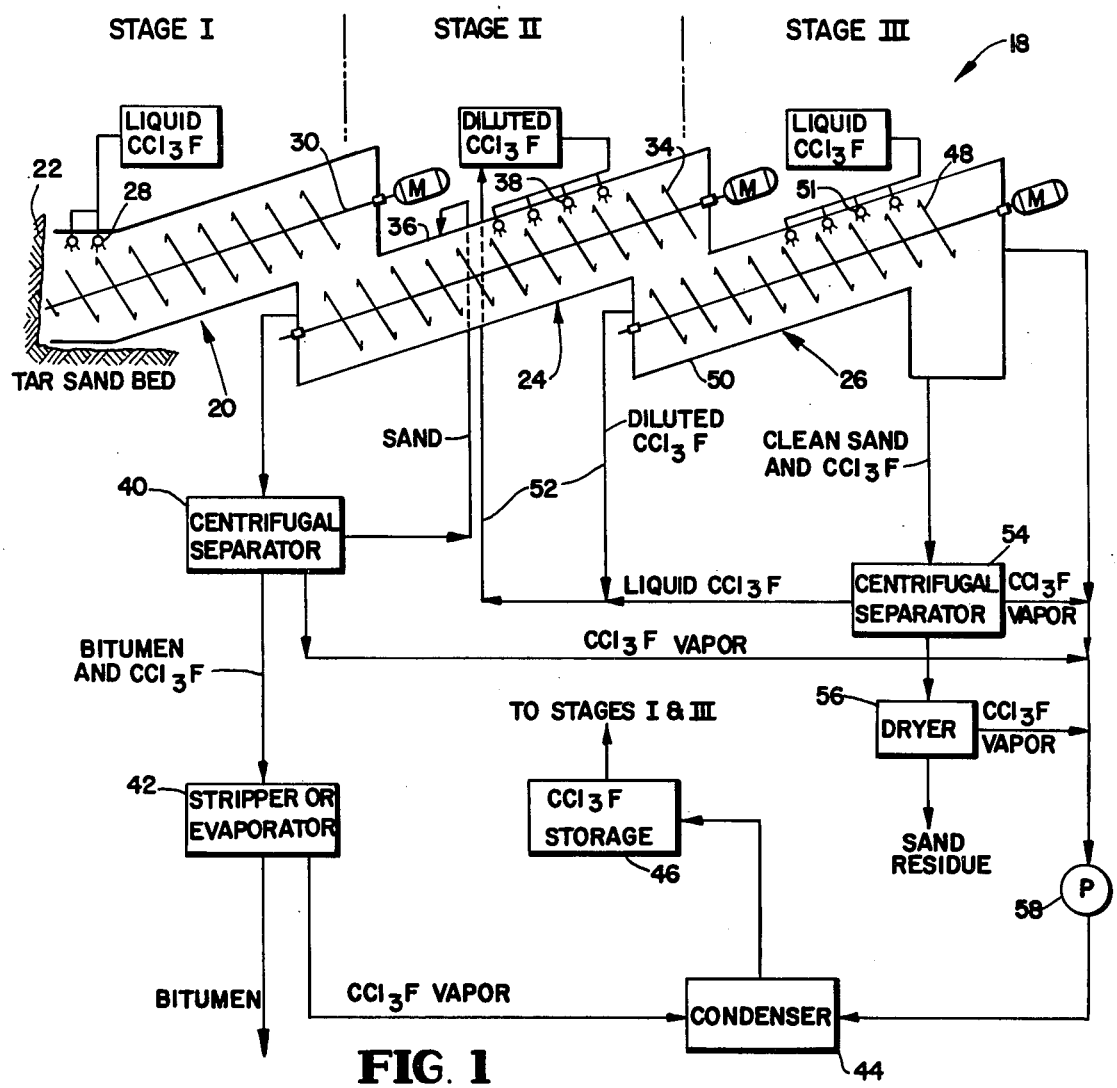
FIG. 1 is a diagrammatic illustration of apparatus for recovering hydrocarbons from tar sands in accord with the principles of the present invention.

Referring now to the drawing, FIG. 1 shows, in diagrammatic form, the apparatus 18 employed and the steps involved in one exemplary method for recovering hydrocarbons from tar sands in accord with the principles of the present invention.

Among the major components of apparatus 18 are a miner 20 for excavating solids from the deposit 22 of tar sands, a first reactor section 24 where the bulk of the bitumen is separated from the tar sand solids by solvent extraction, and a second reactor section 26 where the sand is cleaned and the remaining hydrocarbon values recovered, again by solvent extraction. Only two extraction stages are shown in FIG. 1 and described below for the sake of convenience. In actual practice as many extraction stages can be employed as are deemed desirable.

The initial step in the process is the mining of the tar sand from deposit 22. This is accomplished by hydraulic mining and, more specifically, by discharging trichlorofluoromethane through nozzles 28 incorporated in miner 20 against the face of the tar sands deposit.

High pressure will typically not be required in this step as contact of trichlorofluoromethane with the tar sands will result in the dislodgement of tar sands from the formation. This capability for mining the sands with at most only low energy inputs is both unique and important from the energy conservation and economic viewpoints.

Because the details of the hydraulic mining step are not critical in the practice of the present invention except for the use of trichlorofluoromethane as the cutting liquid and as techniques and equipment for the hydraulic mining of tar sands are described in U.S. Pat. Nos. 2,587,729 issued May 4, 1952, to Huff and U.S. Pat. No. 3,050,289 issued Aug. 21, 1962, to Gerner and elsewhere, the hydraulic mining step will not be described further herein.

A substantial proportion of the bitumen in the tar sand dissolves in the trichlorofluoromethane solvent in the mining step. This results in a more-or-less plastic mixture typically having approximately the same consistency as wet cement.

This mixture is conveyed away from the working face of the deposit by an auger type conveyor 30 and discharged into the feed end of the first or extraction reactor section 24 of apparatus 18. This reactor section will typically consist of an auger type conveyor 34 in a housing 36 sloping upwardly from its inlet toward its discharge end.

Spray nozzles 38 are located toward the discharge side of reactor section 24. Trichlorofluoromethane recovered from the second reactor section 26 in a manner which will be explained presently and diluted by hydrocarbons recovered from reactor section 26 is sprayed through nozzles 38 onto the tar sands moving upwardly through reactor section 24. Auger 34 agitates the sand, ensuring intimate contact between the solids and the extraction solvent.

The solvent flows downwardly toward the feed end of the reactor in counterflow relationship to the movement of the tar sand. As mentioned above, this flow relationship makes the most effective use of the extraction solvent.

The diluted extraction solvent and the hydrocarbons separated from the tar sands in reactor 24 collect in the lower, inlet side of the latter. This liquor, typically having a bitumen content of 40–60 percent by weight, is removed from reactor section 24 and delivered to a centrifugal separator 40. Here, any solids mixed with the solvent and recovered hydrocarbons are separated and returned to reactor section 24 as indicated in FIG. 1.

The liquid bitumen and trichlorofluoromethane phase proceeds to a stripper or evaporator 42, also of conventional character. Here, the trichlorofluoromethane is separated from the hydrocarbons, typically by distillation.

Because the trichlorofluoromethane flows through both reactor sections and last through the lower end of reactor section 24 where the tar sands have the heaviest concentration of bitumen, the liquor flowing to system component 42 consists primarily of bitumen. This is important in that it minimizes the amount of solvent to be separated and, therefore, the energy consumed in and the cost of recovering the solvent.

The energy consumed in the solvent separation step is also low because the boiling point of trichlorofluoromethane permits the solvent to be distilled off at a low temperature. An added advantage of the low temperature solvent separation step is that unwanted chemical changes in and loss of low boiling point constituents from the bitumen are avoided.

At this stage, the hydrocarbons have been isolated and are ready for upgrading and conversion into gasoline, lubricants, and other products. The solvent is condensed and converted back to liquid form in a conventional condenser 44 and then returned to a solvent storage facility 46.

The tar sand exiting from the extraction reactor section 24 is partially, but not entirely, free of hydrocarbons. This sand is discharged into the inlet of reactor section 26, which is similar to the reactor section 24 in that it includes an auger type conveyor 48 encased in an upwardly inclined housing 50.

As the sand is conveyed through housing 50 by the auger, essentially hydrocarbon free liquid trichlorofluoromethane is sprayed on the sand through nozzles 51, again with agitation provided by the auger and in counterflow relationship to the tar sand moving through the reactor. This removes essentially all of the remaining bitumen from the mineral solids.

The recovered hydrocarbons and the solvent collect in the lower end of housing 50. This liquor is composed of liquid trichlorofluoromethane and bitumen recovered in the cleaning step.

The bitumen content of the liquor is preferably kept at a low value (in the 5–20 percent range, for example). This, coupled with the small amount of liquor discharged from reactor 26 with the cleaned sand, results in only minute amounts of the bitumen remaining on the sand when the trichlorofluoromethane is subsequently recovered.

The solvent, hydrocarbon liquor is recovered from reactor section 26 and flows through piping 52 to extraction section 24 where it is utilized as the extraction solvent in the initial hydrocarbon recovery stage of the process for the reasons discussed above.

The discharge from conveyor 48 in reactor section 26 consists of clean sand and trichlorofluoromethane. The mixture is delivered to a second centrifugal separator 54 where the mixture is separated into liquid and solid phases. The liquid is combined with that recovered from the lower end of reactor section 26 for use as an extraction solvent in extraction section 24 of apparatus 18.

The sand is transferred to a dryer 56 where any remaining solvent is vaporized. Again, because of the low boiling point of the solvent and the relatively small amount of solvent involved, energy requirements for this step are low (the dryer temperature will typically not be in excess of 100° F.).

The sand discharged from dryer 56 is essentially free of carbonaceous material and of toxic chemicals that would discourage the growth of new vegetation. Furthermore, on a by weight basis it constitutes only about one-fourth as much as the tailings from the now employed flotation process. The latter, moreover, are laden with bitumen, sulphurous compounds, and water and must be impounded in a settling basin. One basin of this character presently in existence is three miles in circumference and surrounded by three hundred foot high dikes. It is an eyesore and a threat to wildfire.

The vapors evolved in dryer 56 are recovered and pumped to condenser 44, there converted to a liquid, and returned to the extraction solvent storage facility 46.

Another important though not indispensable component of apparatus 18 is a compressor 58 connected between the outlet side of reactor section 26 and condenser 44.

Compressor 58 serves two important functions. First, it compresses the trichlorofluoromethane vapors to a pressure such that they can be condensed to a liquid in condenser 44 with water or ambient air.

Second, pump 58 maintains the interior of reactor sections 24 and 27 and mining section 20 at a slight negative pressure. Accordingly, any trichlorofluoromethane vaporized in these three sections is also recovered and pumped to condenser 44 for liquification and return to solvent extraction storage facility 46.

This, coupled with the recovery of the solvent in centrifugal separators 40 and 54 and from stripper or evaporator 42 and dryer 56, results in an almost complete recovery of the extraction solvent. If desired, the solvent loss can be reduced even further by connecting the centrifugal separators to the inlet side of compressor 58 as shown in FIG. 1 to maintain a negative pressure in and to recover vapors evolved in these components. Also, an air or nitrogen purge can be employed to flush from dryer 56 any remaining trichlorofluoromethane vapor.

In comparison to the conventional flotation process, that just described and carried out in apparatus 18 is capable of extracting hydrocarbons from tar sands at one half the cost and with approximately one-fourth the fuel consumption. The process further contrasts with flotation techniques in that the consumption of water in our process is minimal (ca. 10 tons/hr. for a 50,000 barrel/day system).

The rate of hydrocarbon recovery is much higher (typically about 0.9 barrels of bitumen per ton of tar sand) as is the throughput rate (less than one minute from the mining of the tar sands to the isolation of the bitumen and cleaning and drying of the mineral solids).

In a typical application, the three stages or sections 20, 24, and 26 of apparatus 18 will be on the order of 4 feet in diameter and 30 feet long. This makes it practical to mount these sections and the ancillary equipment discussed above on one or more mobile chassis. This permits the apparatus to be moved through the deposit being produced, eliminating the necessity of transporting the excavated tar sand from the mining face to a stationary plant and minimizing the problem of waste product disposal.

Apparatus 18 can, with readily made modifications, also be employed to extract the kerogen from oil shales and for similar applications. In this case, explosives rather than hydraulic mining will typically be employed to mine the hydrocarbon bearing solids because oil shale is more monolithic and difficult to mine than those less consolidated composites such as tar sands.

Figure 2:
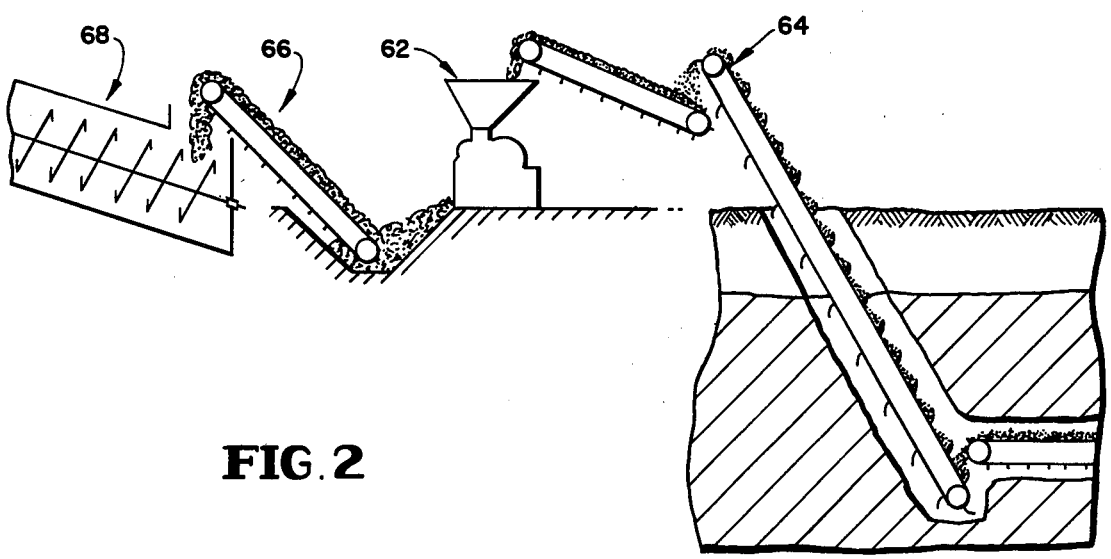

The mined rubbleized oil shale is elevated to the surface from the mining face and delivered to a crusher 62 by a conventional conveyor system 64 as shown in FIG. 2.

Crusher 62 reduces the shale to a particulate material typically resembling coarse sand (particles less than 0.25 inch in diameter but retainable on a number 6 mesh screen).

The crushed shale is transported by a second conveyor 66 to and discharged into the inlet end of a solvent extraction reactor 68 of the same character as the extraction section 24 of apparatus 18 for recovery of the hydrocarbon values.

The apparatus may, with the exceptions just discussed, be essentially as described above in conjunction with the embodiment of the invention illustrated in FIG. 1.

The particular techniques used and equipment employed in mining and crushing in the shale are not critical in the practice of the present invention as just described. One shale mining method which may be employed is described in U.S. Pat. No. 3,537,753 issued Nov. 3, 1970, to Arendt. U.S. Pat. No. 3,112,255 issued Nov. 26, 1963, to Campion shows that methods and machinery for crushing oil shale to particles from which kerogen can be extracted are known.

As indicated previously, the principles of the present invention can also be applied to the in situ recovery of hydrocarbons from tar sands and similar geological composites and from exhausted oil bearing formations. The steps in an exemplary method of this character and certain of the equipment employed in the process is shown in FIGS. 3A and 3B.

The hydrocarbon recovery step of the process is shown in FIG. 3A. Vertical shafts 70 are sunk in the tar sand deposit, and submersible pumps 72 are located in the lower ends of the shafts. A further vertical shaft 74 is sunk into the deposit at generally equal distances from the shafts in which pumps 72 are located.

In the initial or start-up phase of the recovery step, liquid trichlorofluoromethane is injected under pressure into all of the shafts 70 and 74, allowed to stand, and then recovered. This sequence is repeated as many times as necessary to produce breakthroughs or channels between shaft 70 and shafts. Alternatively, high pressure, for example, can be employed to produce communication between the shafts.

Liquid trichlorofluoromethane is then injected under pressure through shaft 74 into the formation at one or more levels above pumps 72 by pump 76, the liquid flowing from shaft 74 into the surrounding deposit as indicated by arrows 78.

The liquid solvent dissolves the hydrocarbons associated with the tar sands, forming a fluid mixture which flows downwardly through the formation to the level of submersed pumps 72. Here the solvent diluted with hydrocarbons is recovered and pumped to the surface.

Again, maximum use is made of the extraction solvent in our process. Tar sands such as those existing in the Athabaska region have a bitumen content which increases with the depth of the bed. As a consequence, the trichlorofluoromethane reaches the richest tar sands last, resulting in the high concentration of hydrocarbons desired for economy in the subsequent step of stripping the solvent from the hydrocarbons.

It was pointed out previously that the principles of the present invention can be applied to the recovery of hydrocarbon values from oil shales and similar hydrocarbon bearing geological composites as well as from tar sands and the like. In situ recovery of oil shale kerogen can be effected in the manner just described in conjunction with FIG. 3A if, before the trichlorofluoromethane is pumped into the oil shale formation, the latter is fractured or otherwise made permeable in a manner which permits the shale to expand so that the solvent can circulate freely through the formation.

U.S. Pat. Nos. 3,661,423 issued May 9, 1972, to Garret; U.S. Pat. No. 1,422,204 issued July 11, 1922, to Hoover; and U.S. Pat. No. 3,481,398 issued Dec. 2, 1969, to Prats disclose exemplary techniques for fracturing oil shale formations with explosives.

Hydraulic fracturing and other, well-known and conventional techniques for reducing rock formations may also be employed for this purpose. An exemplary technique for hydraulically fracturing oil shale formations is described in U.S. Pat. No. 3,501,201 issued Mar. 13, 1970, to Closmann.

In conjunction with the foregoing, the fracturing of oil shale formations is often accomplished by removing solids at the bottom of the formation and expanding the remaining shale into the void (see, for example, the Garret patent just cited). If this approach is employed in the practice of the present invention, a sump can be created at the bottom of the fractured region. The solvent and recovered hydrocarbons will collect in and can be pumped to the surface from the sump.

It will be apparent to those skilled in the relevant arts that the hydrocarbon recovery technique just described is equally applicable to the recovery of oil from oil bearing formations which have been exhausted by conventional production techniques. In this application, advantage can typically be taken of existing well holes to reduce the number of shafts it is necessary to sink or to even eliminate the need for additional shafts.

The in situ recovery of the hydrocarbon values from the tar sand bed or other produced formation is followed by recovery of any trichlorofluoromethane which may have vaporized in the course of the extraction process. This is readily accomplished by connecting a compressor through appropriate plumbing to the upper end of the shaft through which the extraction solvent was injected.

In the exemplary embodiment of the invention shown in FIGS. 3A and 3B, the compressor 80 pumps the vaporized solvent from the tar sand deposit back into shaft 74 as shown by arrows 82 in FIG. 3B and then upwardly through the shaft to the surface. The recovered vapor is pumped to a condenser (not shown) to convert it to liquid form and then returned to the solvent extraction storage facility or reinjected into the formation.

To complete the recovery of the extraction solvent, air or nitrogen can be pumped into and through the formation to flush out the vaporized solvent. A vacuum pump is then employed to recover the solvent.

Alternatively, or in addition, the formatin can be flooded with water to recover the solvent.

It will be apparent that the technique for producing formations just described does not depend for the advantages it has entirely on the use of trichlorofluoromethane as the extraction solvent. Therefore, while the solvent just identified is preferred, other solvents can be employed without losing all of the benefits of our techniques. Solvents which the prior art suggests might be useful in this process are identified in various ones of the patents identified above.

Referring again to the drawing, FIG. 4 shows the remaining above-ground components of an exemplary system 90 for the in situ recovery of hydrocarbon values from subterranean geological formations in accord with the principles of the present invention as well as a modified technique for injecting the extraction solvent into the formation. Also, in this Figure, the system is shown in association with an oil shale formation rather than tar sands simply to reinforce the point that the in situ hydrocarbon recovery techniques we have invented are applicable to hydrocarbon bearing formations other than tar sands.

Turning now to the drawing, the solvent and hydrocarbon containing liquid lifted to the surface by pumps 72 flows to a concentrator 92 consisting of a shell 94 housing a condensing coil 96 (or, alternatively, a jacketed sluiceway, a baffled heat exchanger, etc.). The heat exchanger is located where it will be submerged in the liquor flowing to the concentrator.

Solids present in the fluid mixture pumped into the concentrator settle to the bottom of the concentrator and are removed by an appropriate conveyor, here shown as an auger type conveyor 100. The solids are cleaned and the extraction solvent associated with them recovered in any suitable manner, typically as discussed above in conjunction with the embodiment of the invention shown in FIG. 1 and utilizing the components incorporated in stage III of apparatus 18.

At the same time, trichlorofluoromethane vapor is circulated through heat exchanger 96 by compressor 102. This vaporizes trichlorofluoromethane from the body 104 of liquid in concentrator 92, increasing the concentration of hydrocarbons in this liquid.

As discussed above, high concentrations of hydrocarbons are preferred for economy in recovering the trichlorofluoromethane in the recovery step.

The concentrated liquor flows to an evaporator 106 of the thin film, agitated film, or other appropriate type where the solvent is recovered from the kerogen. This isolates the kerogen for further processing.

The vaporized solvent is returned through line 108 to the inlet side of compressor 102.

The extraction solvent vapor given off in the liquor concentration step just described flows upwardly through a demister 110, which separates any liquid associated with the vapor, and then passes through line 112 to the inlet side of compressor 102.

The heat given up to the solvent, hydrocarbon liquor by the trichlorofluoromethane in condensing coil 96 converts this solvent to a liquid. The liquid solvent flows through line 114 to pump 76 which injects it into the formation being produced as described above.

As shown in FIG. 4, the temperature of the extraction solvent can be elevated by a heater 116 connected in series with pump 76 before the solvent is injected into the formation. The addition of moderate amounts of heat to the solvent may be desirable as this will increase the rate at which the solvent diffuses through the formation being produced.

FIG. 4 also shows that the solvent may be injected into the formation through a casing 118 in one of the vertical shafts 70 sunk for a submersible pump 72. This eliminates the necessity of sinking a separate shaft for injecting the extraction solvent.

The concentrator described above in conjunction with FIG. 4 and other arrangements for increasing the concentration of the hydrocarbons in the trichlorofluoromethane can also be employed to advantage in other applications of the invention including those described above to reduce the cost of recovering the solvent. In the system shown in FIG. 1, for example, the concentrator can be interposed between centrifugal separator 40 and stripper 42 for this purpose.

The invention may of course be embodied in forms other than those just described without departing from the spirit or essential characteristics thereof. The present embodiments are therefore to be considered in all respects as illustrative and not restrictive, the scope of the invention being indicated by the appended claims rather than the foregoing description; and all changes which come within the meaning and range of equivalency of the claims are therefore fully intended to be embraced therein.

What is claimed and desired to be secured by Letters Patent is:

1. A method of mining hydrocarbon bearing geological composites which includes the step of directing a solvent which is essentially non-reactive with said hydrocarbons under the process conditions and is or comprises trichlorofluoromethane against a deposit or formation of said composite to extract hydrocarbons therefrom and form a fluid phase containing the hydrocarbons.

2. A method of recovering hydrocarbons from an oil bearing formation which has been exhausted by conventional production techniques, said method comprising the steps of: forming a fluid phase containing the hydrocarbons by injecting a solvent which is essentially non-reactive with said hydrocarbons under the process conditions and which is or comprises trichlorofluoromethane into the formation at a first level and allowing said solvent to percolate downwardly through said formation and extract from the mineral solids hydrocarbons present in said formation to thereby form said fluid phase; recovering the phase containing the solvent and the extracted hydrocarbons at a level below said first level; and elevating said phase containing the solvent and said hydrocarbons to the surface.

3. The method of separating the organic constituents of a hydrocarbon and mineral solids composite from the mineral solids in said composite comprising the step of contacting the composite with an organic solvent which is essentially non-reactive with said organic constituents under the process conditions and which is or contains trichlorofluoromethane to extract the organic constituents from said composite, the composite from which the organic constituents are to be separated first being mined from a geological formation in which it is located by impinging trichlorofluoromethane in the liquid phase against the formation.

4. The method of separating the organic constituents of a hydrocarbon and mineral solids composite from the mineral solids in said composite comprising the step of contacting the composite with an organic solvent which is essentially non-reactive with said organic constituents under the process conditions and which is or contains trichlorofluoromethane to extract the organic constituents from said composite, said step of separating the organic constituents from the mineral solids being carried out in situ in a geological formation of the hydrocarbon and mineral solids composite.

5. The method of claim 4, together with the step of heating the solvent prior to contacting said composite with said solvent to thereby increase the rate at which said solvent will diffuse through and extract organic constituents from said composite.

6. The method of claim 4, together with the step of increasing the permeability of the hydrocarbon and mineral solids composite before the solvent is contacted with the composite to promote contact between said solvent and the composite.

7. The method of separating the organic constituents of a hydrocarbon and mineral solids composite from the mineral solids in said composite by contacting the composite with an organic solvent comprising liquid trichlorofluoromethane to extract the hydrocarbons therefrom, the separating of the hydrocarbons from the mineral solids being carried out in situ in a geological formation of the hydrocarbon and mineral solids composite and by: disposing pumping means in the formation of the composite; then injecting the organic solvent into the formation at a level above and in the vicinity of said pumping means, whereby the solvent and hydrocarbons extracted from the geological composite thereby will migrate down through the formation toward said pumping means and can be recovered and pumped to the surface thereby; and, after the solvent and hydrocarbons are recovered from the formation, recovering from said formation trichlorofluoromethane vaporized in the hydrocarbon extraction step.

8. The method of claim 7, wherein the solvent and hydrocarbons are pumped to the surface with a submersible pump.

9. The method of producing a hydrocarbon bearing geological formation comprising the steps of: injecting a liquid hydrocarbon solvent into said formation; allowing said liquid solvent to percolate downwardly through said formation; pumping the liquid solvent and hydrocarbons released from the formation by said solvent as it percolates downwardly through said formation to the surface from a level below that at which any solvent is injected into the formation; recovering from the formation solvent which becomes vaporized as said solvent percolates downwardly through said formation; and condensing recovered vaporized solvent and injecting it into said formation, said vaporized solvent being condensed by circulating it into heat transfer relationship with the liquid solvent and hydrocarbons recovered from said formation.

* * * * *

UNITED STATES PATENT OFFICE
CERTIFICATE OF CORRECTION

Patent No. 4,027,731     Dated June 7, 1977

Inventor(s) Clay D. Smith et al

It is certified that error appears in the above-identified patent and that said Letters Patent are hereby corrected as shown below:

Column 4, line 36 change "solvent a gives" to --solvent, gives--

Column 10, line 47 change "27" to --26--

Column 12, line 1 after "shafts" add --74--

Signed and Sealed this

Twenty-eighth Day of February 1978

[SEAL]

Attest:

RUTH C. MASON  
Attesting Officer

LUTRELLE F. PARKER  
Acting Commissioner of Patents and Trademarks